May 23, 1933.   J. L. GUINAN   1,910,793
GRAIN CONDITIONER
Filed May 13, 1930   2 Sheets-Sheet 2

INVENTOR.
Joseph L. Guinan
BY
Philip A. H. Jerrell
ATTORNEY.

Patented May 23, 1933

1,910,793

UNITED STATES PATENT OFFICE

JOSEPH L. GUINAN, OF OMAHA, NEBRASKA

GRAIN CONDITIONER

Application filed May 13, 1930. Serial No. 451,994.

The invention relates to grain conditioners and has for its object to provide a device of this character wherein a continuous circulation of chemically laden air is maintained through a grain bin, and particularly adapted for elimination of weevil, bran bugs, parasites, grain lice, larvæ, and other conditions under which it is necessary to treat grain.

A further object is to provide a chemical tank in the pipe line, and through which air is forced by a pump in its circulation. Also to provide a suction pump on the return line for speeding up the circulation when desired, and means where either or both of said pumps may be operated.

A further object is to provide a heating element in the pipe line and through which the air may be by-passed before entering the grain bin for relieving moisture from the air and discharging heated air into the grain bin for drying purposes. Also to provide means whereby the heated air with the moisture taken up within the grain bin may be discharged to the atmosphere.

A further object is to provide a plurality of discharge pipes extending upwardly into the grain bin, and terminating in hoods which will direct the air downwardly into the grain body, and will prevent grain from passing into the discharge pipe.

A further object is to support upwardly extending discharge pipe or annular pipes cross connected whereby the air discharged into the grain bin will be distributed over substantially the entire area of the bin. Also to provide valve means where air entering the bin may be discharged directly to the atmosphere.

A further object is to provide annular discharge pipes cross connected to the upper end of the bin, and provided with downwardly extending pipes, through which air leaving the bin is forced and sucked.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
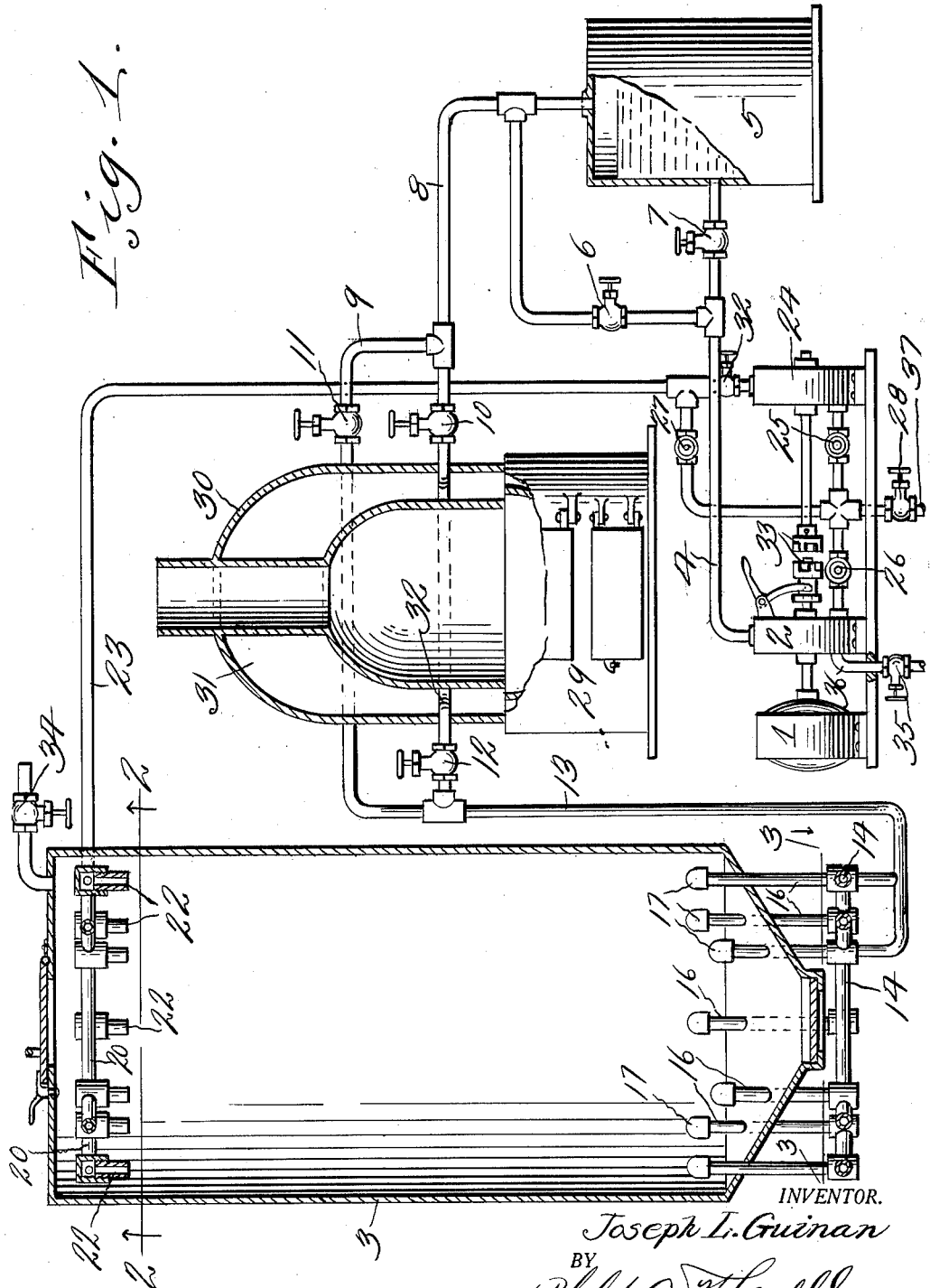
Figure 1 is a vertical transverse sectional view through the grain bin and portions of the apparatus, other parts being shown in elevation.
Figure 2:
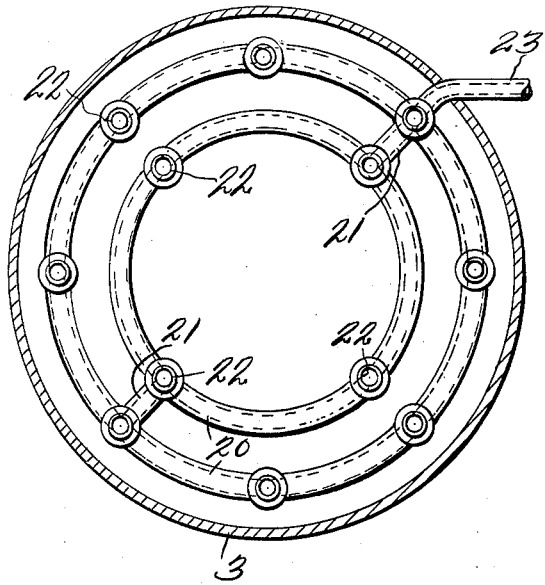
Figure 2 is a horizontal sectional view through the upper end of the grain bin taken on line 2—2 of Figure 1.
Figure 3:
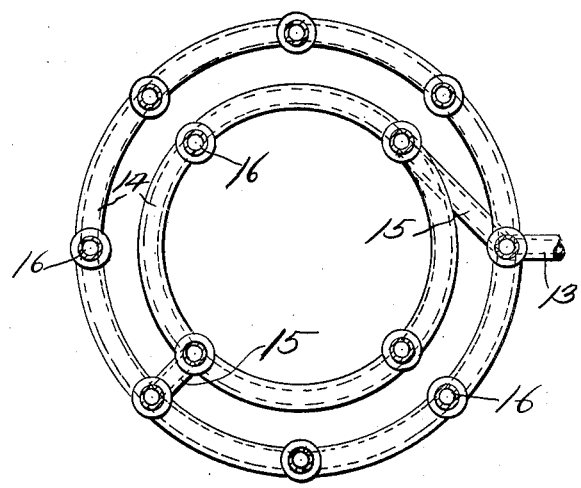
Figure 3 is a horizontal sectional view taken on line 3—3 of Figure 1.
Figure 4:
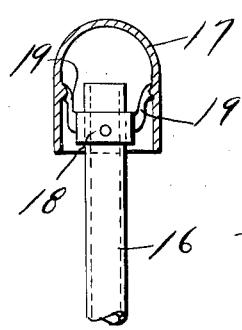
Figure 4 is a sectional view through one of the deflecting hoods.

Referring to the drawings, the numeral 1 designates a conventional form of motor, which motor drives a conventional form of rotary pump 2 for circulating air through the grain bin 3. Connected to the pump 2 is a pipe 4, through which the air passes, and which air passes into the chemical receptacle 5, when the by-pass valve 6 is closed, and the valve 7 is opened. The air which passes into the chemical tank 5 takes up chemicals and passes through the pipe 8, and through the by-pass pipe 9 when the valve 10 is closed, and the valve 11 opened, and at which time the valve 12 is closed. After leaving the by-pass pipe 9, the air passes downwardly through the pipe 13 to the distributer member comprising annular pipes 14, located beneath the bin 3, and provided with a branch connection 15, and with upwardly extending discharge pipes 16, which extend upwardly into the lower end of the bin, and are provided with hoods 17 on their upper ends of larger interior diameter than the exterior diameter of the pipes 16, whereby the air will be discharged downwardly into the mass of grain, and the hoods will prevent grain from entering the pipe 16. Hoods 17 are preferably supported on the pipes 16 by means of sleeves 18 mounted on the pipes and having arms 19 connecting them to the hoods, as clearly shown in Figure 4.

Disposed in the upper end of the grain bin is a combined discharge and suction member comprising annular pipes 20 having a cross connecting pipe 21, and provided with downwardly extending suction nozzles 22, through which the air forced into the bin 3 passes to pipe 23, however to insure a positive and quick operation, pipe 23 is connected to a suction pump 24, which when the valves 25 and 26 are open, and valve 27, as well as valve 28 closed, discharges the air again into the pump 2, so that the air will be recirculated through the system, following the course above described. It will be seen that the grain will be chemically treated for the desired period.

If it is desired to simply treat the grain to an air circulation, valve 6 is opened and valve 7 closed, thereby by-passing the recirculating air around the chemical tank 5. Under some conditions it is desirable to heat the air for taking the moisture out of the grain, or for absorbing the maximum amount of chemical solution, and to accomplish this result a furnace 29 is provided having a hood 30, into the chamber 31 of which heat units are radiated, and through which a pipe 32 extends. Under the heat treatment the valve 11 is closed and valves 10 and 12 opened, therefore it will be seen that the recirculating air will be heated as it circulates.

Under some conditions the use of suction pump 24 may not be necessary, for instance where there is a relatively small bulk of grain to be treated, and when it is desired to cut the suction pump 24 out of the circuit. This may be accomplished by closing the valves 25 and 32, and of course the valve 35 is then open as well as valve 27, but valve 28 is closed and clutch 33 declutched.

Valve 28 is opened for discharging air to the atmosphere, and which air is moisture laden during the moisture treatment. Under some conditions, it is desirable to force air through the bin 3 from the pump 2, either chemically laden, heated, or without chemical or heat, and to exhaust the air directly to the atmosphere after passing through the grain in the bin 3. To accomplish this result the exhaust valve 34 on top of the bin is opened, while valves 27 and 32 are closed, therefore it will be seen that the air will not return through the pipe 23, and as soon as it takes up the moisture is immediately discharged to the asmosphere. Under this treatment, pump 2 is used, and suction of air for the pump may be obtained by opening valves 26 and 28, or if desired the valve 35 on the special suction pipe 36 may be opened, and of course under these conditions the valve 26 would be closed. Either method is optional with the operator. The air discharge pipe 37, which carries the valve 28 may discharge into a bin instead of directly to the atmosphere, and applicant does not limit himself in this respect, nor does he limit himself to recirculating air through the system, as it is obvious under some conditions the recirculating feature is not necessary.

From the above it will be seen that a grain conditioner is provided which is simple in construction, and one wherein air, chemically laden, may be forced into and sucked from a grain bin for treating grain; the grain treated to air with or without chemical treatment if desired, or hot air, chemically laden, or without chemical treatment recirculated.

The invention having been set forth what is claimed as new and useful is:—

A grain conditioner comprising a bin, a heating device, a chemical receiving tank, a force pump, means whereby air may be forced through the tank, the heating device and into one end of the grain bin and means whereby air may be simultaneously sucked from the other end of the grain bin, thereby preventing back pressure on air forced into the grain bin.

In testimony whereof he hereunto affixes his signature.

JOSEPH L. GUINAN.